United States Patent
Gottardo et al.

(10) Patent No.: US 7,145,573 B2
(45) Date of Patent: Dec. 5, 2006

(54) METHOD AND SYSTEM TO COMBINE A DIGITAL GRAPHICS OBJECT AND A DIGITAL PICTURE

(75) Inventors: David Gottardo, Nice (FR); Philippe Lafon, Cagnes sur Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/835,722

(22) Filed: Apr. 30, 2004

(65) Prior Publication Data

US 2005/0134601 A1    Jun. 23, 2005

(51) Int. Cl.
*G09G 5/02* (2006.01)

(52) U.S. Cl. ............ 345/589; 345/590; 345/592; 345/629; 345/611

(58) Field of Classification Search ............ 345/589, 345/590, 592, 629, 611
See application file for complete search history.

(56) References Cited

U.S. PATENT DOCUMENTS

| | | | |
|---|---|---|---|
| 5,687,331 A * | 11/1997 | Volk et al. | 715/840 |
| 6,377,269 B1 * | 4/2002 | Kay et al. | 345/589 |
| 2003/0219163 A1 * | 11/2003 | Kelly | 382/245 |
| 2005/0091486 A1 * | 4/2005 | Avraham et al. | 713/162 |

* cited by examiner

*Primary Examiner*—Kee M. Tung
*Assistant Examiner*—Mike Rahmjoo
(74) *Attorney, Agent, or Firm*—Alan K. Stewart; W. James Brady, III; Frederick J. Telecky, Jr.

(57) ABSTRACT

Combining a graphics object with a picture where only the luminance value of a graphics object pixel is written to a corresponding picture pixel if the chrominance values of the graphics object pixel indicate transparency and yet the luminance value indicates non-transparency.

11 Claims, 3 Drawing Sheets

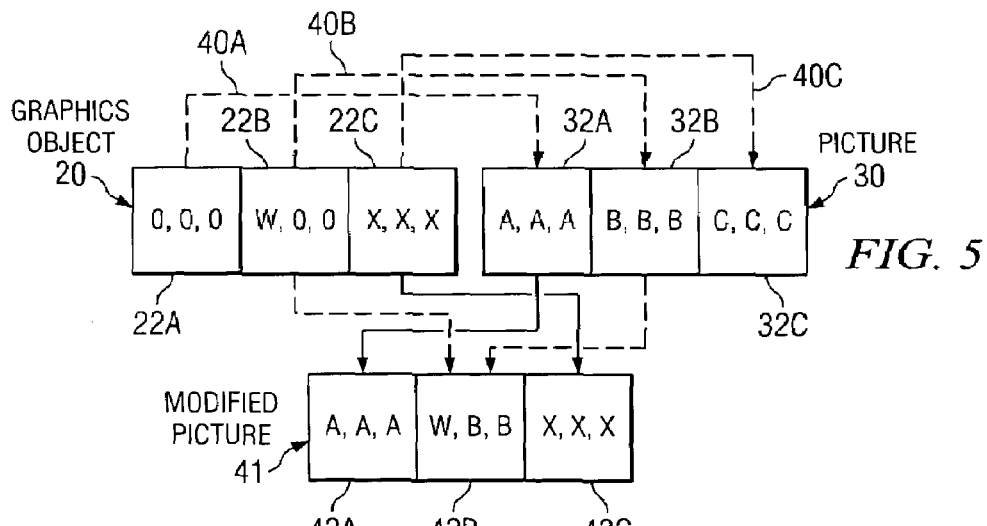
FIG. 1
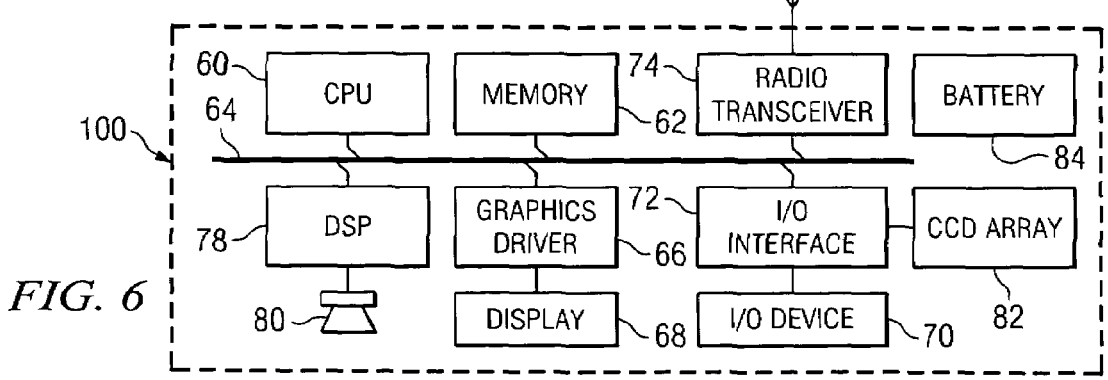
FIG. 5
FIG. 6

METHOD AND SYSTEM TO COMBINE A DIGITAL GRAPHICS OBJECT AND A DIGITAL PICTURE

CROSS-REFERENCE TO RELATED APPLICATIONS

This application claims the benefit of European Patent Application No. 03293278.2 filed Dec. 19, 2003, and incorporated herein by reference as if reproduced in full below.

STATEMENT REGARDING FEDERALLY SPONSORED RESEARCH OR DEVELOPMENT

Not applicable.

BACKGROUND OF THE INVENTION

1. Field of the Invention

Embodiments of the invention are directed to methods and related systems of improving image quality when overlaying a digital graphics object on a digital picture. More particularly, the embodiments of the invention are directed to detecting and correcting pixels in the graphic object with slight color-key variation caused by scaling and/or filtering.

2. Description of the Related Art

Digital pictures, whether a single picture or a series of pictures representing video, may be modified by the addition of special effects, such as overlaying a graphics object on the digital picture. The graphics object may contain features such as borders, titles, and/or dates that are inserted into the picture or pictures.

In order to distinguish graphics objects pixels that should replace pixels in the digital picture from graphics object pixels that are not intended to replace pixels in the digital picture, a color-key system may be used. In a color-key system, a particular color is designated as the color-key, and during an overlay process pixels having the value of the color-key are not inserted into the digital picture. Stated oppositely, when a graphics object pixel does not hold the color-key value the graphics object pixel replaces the corresponding pixel within the digital picture.

However, graphics objects intended to be overlaid on digital pictures may not necessarily be the correct size. To make a graphics object larger, a scaling routine may add pixels to the picture, and select colors for the added pixels. Likewise, in making a graphics object smaller a scaling routine may be responsible for removing and/or combining pixels, and selecting appropriate colors for the newly formed pixels. In the process of scaling, the scaling program may inadvertently change the values of color-key pixels within the graphics object. Changes to the color-pixels may also occur when the graphics object is digitally filtered.

Regardless of the mechanism by which a color-key pixel's color is changed, in the overlay process errant pixels are assumed to be part of the graphics object and thus are written to the digital picture, affecting image quality.

SUMMARY OF THE SOME OF THE PREFERRED EMBODIMENTS

The problems noted above are solved in large part by a method and related system of combining a graphics object with a picture. Some of the exemplary embodiments may be a method comprising combining a graphics object with a digital picture by reading luminance and chrominance values of the graphics object pixel, and writing only the luminance value of the graphics object pixel to the corresponding picture pixel if the chrominance values of the graphics object pixel indicate transparency and the luminance value indicates non-transparency.

Other exemplary embodiments may be a system comprising a processor and a memory coupled to the processor. The processor, executing a program, overlays a graphics object on a picture by replacing only a luminance value of a picture pixel with a luminance value of a graphics object pixel if the graphics object pixel indicates partial transparency.

Yet other exemplary embodiments may be a method comprising overlaying a graphics object on a picture by leaving a picture pixel unchanged if a corresponding graphics object pixel has a value indicating full transparency, replacing a luminance value of the picture pixel with a luminance value of the graphics object pixel if the graphics object pixel indicates partial transparency, and replacing both a luminance value and chrominance value of the picture pixel if the graphics object pixel indicates non-transparency.

BRIEF DESCRIPTION OF THE DRAWINGS

For a more detailed description of embodiments of the present invention, reference will now be made to the accompanying drawings, wherein:

FIG. 1 illustrates a portion of a graphics object having a plurality of pixels whose color is only a slight variation from the color-key;

FIG. 5 graphically illustrates the overlaying method of FIG. 4; and

FIG. 6 illustrates a processor-based system in accordance with embodiments of the invention.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or mechanical connection. Thus, if a first device couples to a second device, that connection may be through a direct connection, or through an indirect connection via other devices and connections.

DETAILED DESCRIPTION OF THE PREFERRED EMBODIMENTS

FIG. 1 illustrates a portion of a graphics object 10 comprising thirty-six exemplary pixels. The pixels labeled with a "B" represent graphics object pixels that will ultimately replace pixels in a digital picture, and thus hold values other than the color-key. Pixels labeled with a "CK" are color-key pixels which are not written into the final image. The exemplary graphics object 10 also comprises a plurality of pixels whose colors are very close to the color-key, and these pixels are labeled "CK+1" and "CK−1." The pixels with a slight variation from the color-key may be inadvertently created during scaling and/or filtering of the graphics object. While the pixels with the slight variation are close to the color-key, in digital operations they are not precisely the defined color-key, and thus errantly represent pixels which should be written to the digital picture. In this way, pixels with slight variations from the color-key find their way to final picture, affecting picture quality.

Embodiments of the invention are directed to methods, and systems, for processing of a graphics overlay to detect and correct pixels with slight changes in color-key values in association with converting or reformatting the color-key values into pre-defined fully and partially transparent values. The embodiments are also directed to methods, and systems, for overlaying a graphics object processed according to the methods on a picture.

Figure 2:
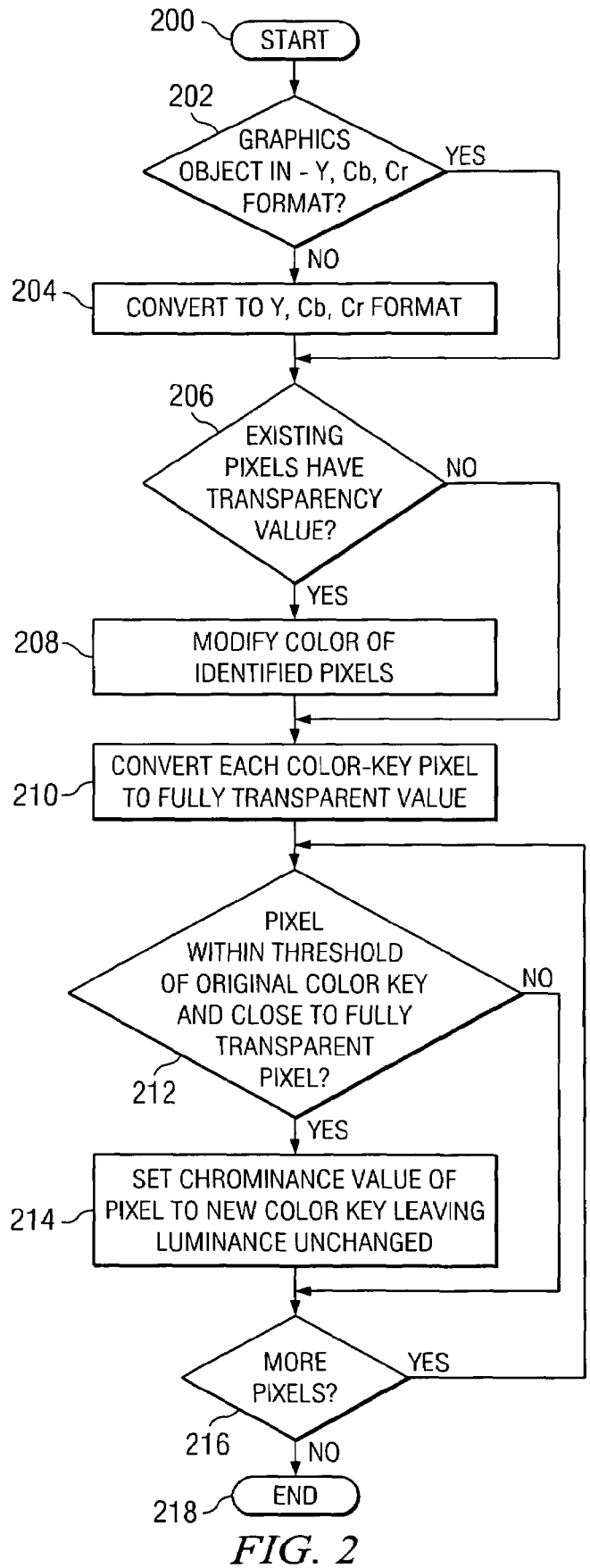
FIG. 2 illustrates a flow diagram in accordance with embodiments of the invention.

FIG. 2 illustrates a flow diagram of the processing of the graphics object in accordance with embodiments of the invention. The processing of a graphics object in accordance with embodiments of the invention may start (block 200), and proceed to a determination of whether the graphics object is in a "Y,Cb,Cr" format (block 202). Pixels of a graphics object may exist in several formats. For example, each pixel may be comprised of three values, one each for the red, green and blue components of the pixel, known as "RGB" format. Alternatively, a pixel may comprise three values comprising a luminance value, and two chrominance values, known as "Y,Cb,Cr" format or a "YUV" format. Embodiments of the invention perform the processing of the graphics object, as well as the overlaying, with pixels of the graphics object in the Y,Cb,Cr format. Thus, if the graphics object is not in Y,Cb,Cr format, it is converted to Y,Cb,Cr format (block 204). Before describing the next steps of FIG. 2, transparency in accordance with embodiments of the invention is discussed.

In reformatting from a color-key system, embodiments of the present invention define two classes of transparency. Pixels of a first class make no contribution in the overlay process, and referred to as fully transparent. Pixels of a second class make no contribution in the overlay process from a color standpoint, but contribute their luminance values. The second class of pixels may be referred to as partially transparent. Although any chrominance values may be designated to indicate transparency in the reformatted graphics object, at least some embodiments of the invention use chrominance values (Cb,Cr) of (0,0) to indicate transparency. Because the graphics object as provided for use may use a variety of colors, including the value intended to represent transparency after reformatting, the next step in the exemplary process of FIG. 2 may be a determination of whether any pixels in the graphics object are the value designated as transparent (block 206). If so, the pixels may be modified (block 208). In accordance with at least some embodiments, the modification may be slight, such as by incrementing or decrementing by one the color value of the pixel. Such an incrementation or decrementation will only make a slight change in the color of the pixel, but will avoid falsely identifying the pixel as transparent.

The next step may be reformatting or converting each graphics object pixel having the value of the color-key to the value indicating full transparency (block 210). In accordance with at least some embodiments, the full transparency is indicated by zeroing the luminance value and each of the chrominance values of the pixel (i.e., Y,Cb,Cr=(0,0,0)).

Because of scaling and/or filtering of the graphics object there may be pixels that should have the color-key value, but instead have slight variations from the color-key value. Thus, the next step is a determination (on a pixel-by-pixel basis) of whether a particular pixel is within a predetermined threshold of, but not precisely equal to, the color-key value, and also whether the particular pixel is in close proximity to a fully transparent pixel (block 212). Although any suitable predetermined threshold may be used, the inventors have found that the range may be dictated to some extent by Cb and Cr values of the color-key value in the base object. For example, if the Cb and Cr values of the color key are less than 200 (e.g., for the color-key Cb=100 and Cr=100), the predetermined threshold may be ±35. If the Cb and Cr values of the color key are greater than 200, the predetermined threshold may be ±70. If for the color-key Cb is less than 200, but Cr is greater than 200, then the predetermined threshold may be within ±35 of Cr without testing Cb value (Cr value becomes predominant for detection and Cb is ignored). Similarly, if for the color-key Cb is greater than 200, and Cr is less than 200, the predetermined threshold may be within ±35 of Cb without testing Cr value (Cb value become predominant for detection and Cr is ignored). As for the physical proximity aspect, this too may vary from immediate neighbors to a plurality of pixels away from the pixel under scrutiny, with the preferred threshold being within and including three pixels. Thus, if a particular pixel is within the threshold of the original color-key value and is sufficiently close to a fully transparent pixel, then in accordance with embodiments of the invention the chrominance values of that pixel are set to a value indicating transparency (block 214); however, the luminance value preferably remains unchanged (block 214). If there are more pixels to analyze (block 216), the process returns to the determination using the predetermination threshold and distance, otherwise the process ends (block 218). FIG. 2 shows the operation on graphics object pixels with slight color-key variations occurring after the conversion of each true color-key pixel to the fully transparent value; however, it is within the contemplation of the invention that the processing with regard to the graphics object pixels having slight variations may be done prior to reformatting color-key pixels to the fully transparent values. In these alternative embodiments, the decisions illustrated by block 212 would be whether the pixel is within a predetermined threshold the color-key value and whether the pixel is in close proximity to a color-key pixel in the graphics object.

Figures 3, 4:
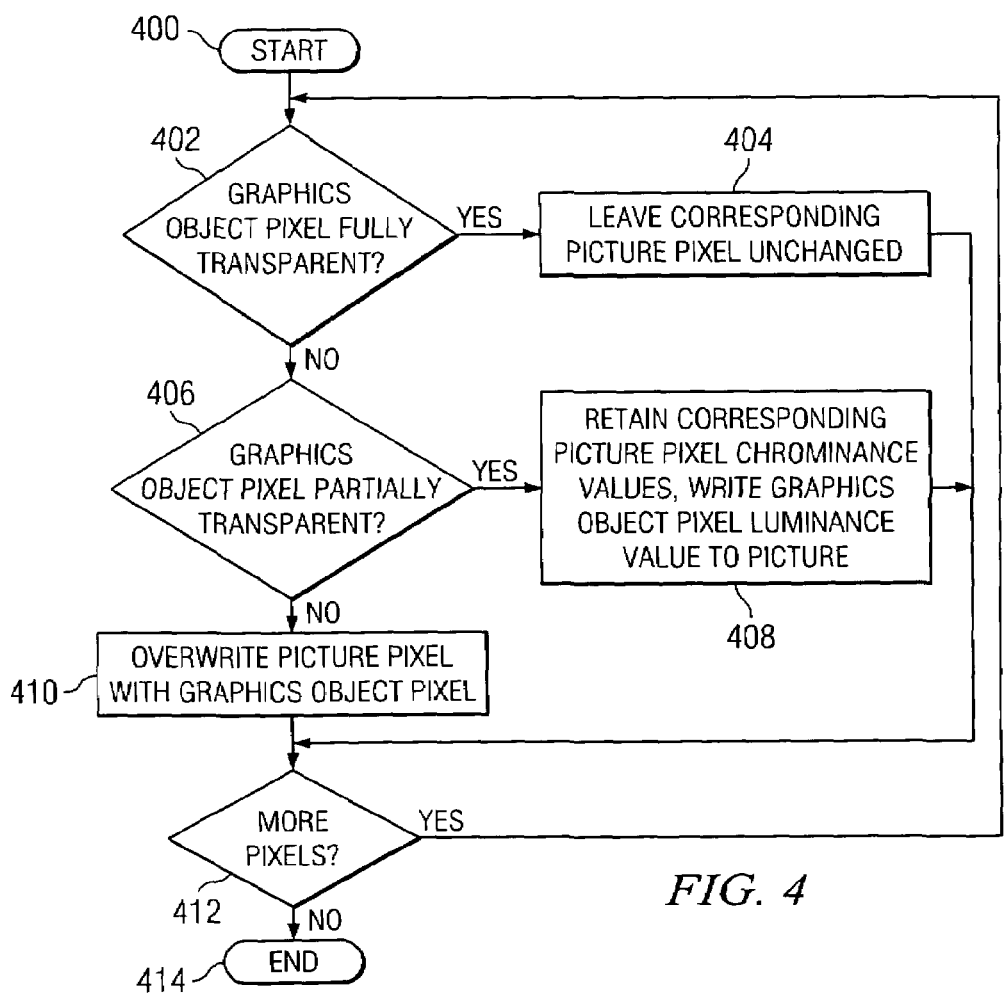
FIG. 3 illustrates the portion of the graphics object of FIG. 1 after operation of the method illustrated in FIG. 2.
FIG. 4 illustrates an overlaying method in accordance with embodiments of the invention.

FIG. 3 illustrates the exemplary graphics object of FIG. 1 after application of the method illustrated in FIG. 2. In particular, the pixels representing the object (pixels labeled "B" in FIGS. 1 and 2) remain unchanged. Pixels that held the color-key value in the unmodified graphics object (labeled "CK" in FIG. 1) are converted to indicate full transparency (represented in FIG. 4 as "0,0,0" values of the Y,Cb,Cr components), although any value may be used to indicate full transparency. For those pixels within FIG. 1 with slight variation from the color-key value, and in close physical proximity to transparent pixels, the chrominance values Cb,Cr indicate transparency, yet the luminance values (W,X,Y and Z in FIG. 3) are retained—partial transparency. The relevance of retaining the luminance values will be discussed more fully below.

Referring again to FIG. 2 to summarize before proceeding, the process may start (block 200) and proceed to converting a graphics object to Y,Cb,Cr format (blocks 202 and 204), if needed. Pixels within the graphics object that happen to have the value selected to indicate transparency are modified to avoid inadvertently becoming transparent (blocks 206 and 208). Thereafter, each pixel within the graphics object with a value precisely equal to the previous color-key value is modified to indicate full transparency (block 210) (e.g., has its luminance and chrominance values zeroed). Each pixel within the graphics object is scanned to determine if it is within a predetermined threshold of the color-key value, and also to determine if it is in within a predetermined number of pixels from a pixel that was originally precisely equal to the color-key value (block 212). If so, only the pixel's chrominance values are changed to indicate transparency, leaving the luminance unchanged (block 214). The graphics object, processed consistent with FIG. 2, may now be overlaid on a digital picture in accordance with embodiments of the invention.

FIG. 4 illustrates an overlaying method in accordance with embodiments of the invention. In particular, the process may start (block 400) and proceed to determining whether a pixel in the graphics object is fully transparent (block 402). If the graphics object pixel is fully transparent, the corresponding picture pixel is left unchanged (block 404). In accordance with at least some embodiments, the determination of whether the graphics object is fully transparent may be a determination of whether the luminance and both chrominance values of the graphics object pixel have a value of zero. If the value of the graphics object pixel does not indicate full transparency, the next step may be a determination of whether the value of the graphics object pixel indicates partial transparency (block 406). In accordance with at least some embodiments of the invention, determining partial transparency may be a determination of whether the chrominance values of the pixel have a value of zero and the luminance value is non-zero. If the graphics object pixel falls into the category or class of partial transparency, the chrominance values of the corresponding picture pixel remain unchanged; however, the luminance value of the corresponding picture pixel is overwritten by the graphics object pixel luminance value (block 408). Thus, in this case only the luminance value of picture is modified by the graphics object.

If the graphics object pixel is neither fully nor partially transparent, it is therefore a pixel that needs to completely overwrite the corresponding picture pixel (block 410). The next step may be determination of whether every pixel in the graphics object has been analyzed (block 412). If not, the process repeats for additional pixels, and otherwise ends (block 414).

FIG. 5 graphically illustrates the overlay method of FIG. 4. In particular, a graphics object 20 may comprise three pixels 22A–C. Likewise, a picture 30 may comprise three pixels 32A–C. Graphics object pixel 22A corresponds to pixel 32A in the picture 30, graphics object pixel 32B corresponds to pixel 32B in the picture 30, and graphics object pixel 22C corresponds to pixel 32C in the picture 30 (the correspondence illustrated by the dashed lines 40). The Y,Cb,Cr values of pixel 22A are all zero, indicating that the pixel is fully transparent. The chrominance values of pixel 22B are zero, yet the pixel's luminance value has a non-zero value W, indicating partial transparency. Finally, pixel 22C has non-zero values for luminance and chrominance values (indicated in the figure as "X,X,X").

In the overlay process, a determination is made as to whether pixel 22A is fully transparent (block 402 of FIG. 4). Because pixel 22A has a value indicating that it is fully transparent, the luminance and chrominance values from picture 30 are thus written to the modified picture 41 (block 404). Thus, the process moves to a determination of whether pixel 22B is fully transparent (block 402). In the exemplary case of FIG. 5, pixel 22B has a luminance value indicating partial transparency, and therefore the luminance value from the graphics object pixel 22B overwrites the luminance values of pixel 32B in the picture 30 to create the pixel 42B in the modified picture 42 (block 408). Finally, with respect to pixel 22C, because this pixel has non-zero values for both its luminance and chrominance, it is neither fully nor partially transparent (blocks 402 and 406). In this case, the luminance and chrominance values from the graphics object are intended to be written to the modified picture, and therefore the corresponding pixel 42C in the modified picture 40 contains the luminance and chrominance values from the graphics object pixel 22C (block 410). While FIG. 5 shows a graphics object, a picture and a modified picture, in alternative embodiments the modified picture is not created and instead to the extent luminance and chrominance values are written from the graphics object, they are written directly to the picture 30.

FIG. 6 illustrates a processor-based system 100 that may implement the methods described above. In particular, the processor-based system may comprise a central processing unit (CPU) 60. The CPU may take many forms depending upon the form of system 100. For example, if the system 100 is a personal computer, the CPU 60 may be a processor, such as processors manufactured by Intel® and/or AMD®. In other embodiments, less computing power may be needed, and thus the CPU may be implemented as a microcontroller.

The processor-based system 100 may further comprise a memory 62 coupled to the CPU, and other devices, by way of a system bus 64. In accordance with at least some embodiments of the invention, the memory may be a volatile or a non-volatile random access memory (RAM). The system 100 may further comprise a graphics driver 66 coupled to the system bus 64. The graphics driver may be responsible for receiving text and images in a digital format from the CPU and/or other components, and displaying the information on an attached display 68. The system 100 may further comprise an input/output (I/O) device (I/O DEV) 70 to allow a user of the system 100 to direct operation and supply information. The I/O device 70 may take many forms depending on the form of the system 100. For example, if the system 100 is a personal computer, the I/O device may be one or more of a keyboard and/or mouse. In some embodiments, the display 68 may be a "touch screen" display, and thus the I/O device 70 and the display 68 may be integral components. Regardless of the form of the I/O device 70, the I/O device 70 may be coupled to the CPU 60, as well as other components, by way of an I/O interface (I/O INTF) 72.

The processor-based system 100 may further comprise, in some embodiments, a radio transceiver 74, and associated antenna 76, coupled to the CPU 60. Thus, system 100 may be a wireless device such as a personal digital assistant (PDA) capable of sending and receiving electronic data. In other embodiments, system 100 may comprise a digital signal processor 78, and corresponding speaker 80, and thus the system 100 may be a cellular telephone, or a device having a combination of functionalities including that of a PDA and cellular telephone. In accordance with at least some embodiments of the invention, the system 100 may be capable of receiving and modifying digital pictures, possibly by overlaying graphics objects on the pictures. The overlaying may be for a single digital picture, or a stream of digital pictures representing motion video.

In addition to, or in place of, the alternative components discussed above, the system 100 may further comprise a charge couple device (CCD) array 82 coupled to the CPU 60. Thus, in these embodiments the system 100 may be a digital camera or video camera. The system 100 may thus be capable of acquiring pictures prior to their modification by application of graphics overlaying. In the portable embodiments, such as a PDA, cellular telephone, digital camera and video camera, the system 100 may also comprise a battery 84.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A system comprising:
    a processor; and
    a memory coupled to the processor;
    wherein the processor, executing a program, overlays a graphics object on a picture by replacing only a luminance value of a picture pixel with a luminance value of a graphics object pixel if the graphics object pixel indicates partial transparency.

2. The system as defined in claim 1 wherein the processor, executing a program, replaces both a luminance value and chrominance value of the picture pixel if the graphics object pixel indicates non-transparency.

3. The system as defined in claim 1 wherein the processor, executing a program, leaves a picture pixel unchanged if the graphics object pixel indicates full transparency.

4. The system as defined in claim 1 further comprising a charge coupled device (CCD) array coupled to the processor, and wherein the processor, executing a program, acquires the picture using the CCD array.

5. The system as defined in claim 1 further comprising a radio transceiver coupled to the processor, and wherein the processor, executing a program, receives at least one of the graphics object or the picture through the wireless transceiver.

6. The system as defined in claim 1 further comprising a radio transceiver coupled to the processor, and wherein the processor, executing a program, transmits the picture created by the overlaying of the graphics object and the picture, the transmitting using the radio transceiver.

7. A method comprising:
    overlaying a graphics object on a picture by
        leaving a picture pixel unchanged if a corresponding graphics object pixel has a value indicating full transparency;
        replacing only a luminance value of the picture pixel with a luminance value of the graphics object pixel if the graphics object pixel indicates partial transparency; and
        replacing both a luminance value and chrominance value of the picture pixel if the graphics object pixel indicates non-transparency.

8. The method as defined in claim 7 further comprising leaving the picture pixel unchanged if the luminance value and chrominance value of the graphics object each have a value of zero.

9. The method as defined in claim 7 further comprising replacing only the luminance value of the picture pixel if the luminance value of the graphics object has a value indicating non-transparency, and the chrominance value has a value indicating transparency.

10. The method as defined in claim 9 further comprising replacing only the luminance value of the picture pixel if the luminance value of the graphics object pixel has a non-zero value, and the chrominance value of the graphics object pixel has a value of zero.

11. The method as defined in claim 7 further comprising replacing both the luminance value and chrominance value of the picture pixel if the luminance value and chrominance value of the graphics object pixel each have a non-zero value.

* * * * *